US012639922B2

(12) United States Patent
Kim et al.

(10) Patent No.: US 12,639,922 B2
(45) Date of Patent: May 26, 2026

(54) BREAST ULTRASOUND DIAGNOSIS METHOD AND SYSTEM USING WEAKLY SUPERVISED DEEP-LEARNING ARTIFICIAL INTELLIGENCE

(71) Applicant: BeamWorks INC., Daegu (KR)

(72) Inventors: Jae Il Kim, Daegu (KR); Won Hwa Kim, Daegu (KR); Hye Jung Kim, Daegu (KR)

(73) Assignee: BEAMWORKS INC., Daegu (KR)

( * ) Notice: Subject to any disclaimer, the term of this patent is extended or adjusted under 35 U.S.C. 154(b) by 478 days.

(21) Appl. No.: 18/276,470

(22) PCT Filed: Feb. 10, 2022

(86) PCT No.: PCT/KR2022/002012
§ 371 (c)(1),
(2) Date: Aug. 9, 2023

(87) PCT Pub. No.: WO2022/173233
PCT Pub. Date: Aug. 18, 2022

(65) Prior Publication Data
US 2024/0312183 A1 Sep. 19, 2024

(30) Foreign Application Priority Data

Feb. 10, 2021 (KR) ........................ 10-2021-0019446

(51) Int. Cl.
G06V 10/764 (2022.01)
G06V 10/25 (2022.01)
(Continued)

(52) U.S. Cl.
CPC ............ G06V 10/764 (2022.01); G06V 10/25 (2022.01); G06V 10/72 (2022.01); G06V 10/774 (2022.01); G06V 2201/032 (2022.01)

(58) Field of Classification Search
CPC ......... G06T 2207/20084; G06T 7/0012; G06T 2207/20081; G06T 2207/10132; G06T 2207/30068; A61B 5/7267; A61B 8/0825
See application file for complete search history.

(56) References Cited

U.S. PATENT DOCUMENTS 11,263,497 B2 3/2022 Peng
2014/0200433 A1 7/2014 Choi et al.
(Continued)

FOREIGN PATENT DOCUMENTS

CN 112288026 A 1/2021
JP 2019209140 A 12/2019
(Continued)

OTHER PUBLICATIONS

Liang, Gongbo, et al. "Weakly-supervised self-training for breast cancer localization." 2020 42nd Annual International Conference of the IEEE Engineering in Medicine & Biology Society (EMBC). IEEE, 2020. (Year: 2020).*
(Continued)

*Primary Examiner* — Raphael Schwartz
(74) *Attorney, Agent, or Firm* — MARSHALL, GERSTEIN & BORUN LLP

(57) ABSTRACT

A breast ultrasound diagnosis method using weakly supervised deep-learning artificial intelligence comprises: an ultrasound image preprocessing step of generating input data including only an image region necessary for learning, by deleting personal information about a patient from a breast ultrasound image; a deep-learning step of receiving the input data, obtaining a feature map from the received input data by using a convolutional neural network (CNN) and global average pooling (GAP), and carrying out re-learning; and a differential diagnosis step of determining the input data as one of normal, benign, and malignant by using the GAP, and when the input data is determined to be malignant, calcu- (Continued)

lating a probability of malignancy (POM) indicating accuracy of the determination.

14 Claims, 12 Drawing Sheets

(51) Int. Cl.
  *G06V 10/72*        (2022.01)
  *G06V 10/774*       (2022.01)

(56)                    References Cited

U.S. PATENT DOCUMENTS

2018/0140282 A1     5/2018   Toyomura et al.
2020/0327409 A1    10/2020   Kim et al.

FOREIGN PATENT DOCUMENTS

| | | |
|---|---|---|
| JP | 2020154720 A | 9/2020 |
| JP | 2021-002339 A | 1/2021 |
| KR | 10-2014-0093376 A | 7/2014 |
| KR | 10-2014-0109320 A | 9/2014 |
| KR | 10-2020-0074940 A | 6/2020 |
| KR | 10-2020-0080626 A | 7/2020 |
| KR | 10-2020-0108685 A | 9/2020 |
| WO | WO-2016194161 A1 | 12/2016 |
| WO | WO-2020175356 A1 | 9/2020 |

OTHER PUBLICATIONS

Lee, Haeyun, Jinhyoung Park, and Jae Youn Hwang. "Channel attention module with multiscale grid average pooling for breast cancer segmentation in an ultrasound image." IEEE transactions on ultrasonics, ferroelectrics, and frequency control 67.7 (2020): 1344-1353. (Year: 2020).*

Zhou, Juan, et al. "Weakly supervised 3D deep learning for breast cancer classification and localization of the lesions in MR images." Journal of Magnetic Resonance Imaging 50.4 (2019): 1144-1151. (Year: 2019).*

Kim Chanho et al: "Weakly-supervised US breast tumor characterization and localization with a box convolution network", Progress in Biomedical Optics and Imaging, SPIE—International Society for Optical Engineering, Bellingham, WA, US, vol. 11314, Mar. 16, 2020 (Mar. 16, 2020), pp. 1131419-1131419, XP060131370, ISSN: 1605-7422, DOI: 10.1117/12.2549203 ISBN: 978-1-5106-0027-0.

Shin Seung Yeon et al: "Joint Weakly and Semi-Supervised Deep Learning for Localization and Classification of Masses in Breast Ultrasound Images", IEEE Transactions on Medical Imaging, IEEE, USA, vol. 38, No. 3, Mar. 1, 2019 (Mar. 1, 2019), pp. 762-774, XP011712621, ISSN: 0278-0062, DOI: 10.1109/TMI.2018. 2872031 [retrieved on Mar. 1, 2019].

European Office Action for Application No. 22752993.0, dated Jan. 10, 2025.

Liang Gongbo et al. "Weakly-Supervised Self Training for Breast Cancer Localization", 2020 42nd Annual International Conference of the IEEE Engineering in Medicine & Biology Society (EMBC)[online], IEEE, 2020, pp. 1124-1127, [Aug. 23, 2024].

Japanese Office Action for Application No. 2023-572502, dated Sep. 3, 2024.

Liang Gongbo et al., "Weakly-Supervised Self Training for Breast Cancer Localization", 2020 42nd Annual International Conference of the IEEE Engineering in Medicine & Biology Society (EMBC) [online], IEEE, 2020, pp. 1124-1127, [Searched on Aug. 23, 2024], Internet: https://ieeexplore.ieee.org/stamp/stamp.jsp?tp=&arnumber= 9176617&tag=1, DOI: 10.1109/EMBC44109.2020.9176617 81.

Shimoda, Kazuto, et al. "Precision Improvement of Weakly Supervised Segmentation by Inferring Change Regions." IEICE Technical Report, vol. 118, No. 512, The Institute of Electronics, Information and Communication Engineers, Mar. 10, 2019, pp. 119-124. (Newly cited document).

Japanese Office Action for Application No. 2023-572502, dated Apr. 1, 2025.

International Search Report for International Application No. PCT/ KR2022/002012, dated May 30, 2022.

Kim, Jaeil et al. Artificial Intelligence in Breast Ultrasonography Ultrasonography. vol. 40, No. 2, pp. 183-190, Nov. 12, 2020. [Retrieved on May 6, 2022]. Retrieved from <https://doi.org/10. 14366/usg.20117>. See pp. 183-188; and figures 1-3.

* cited by examiner (Dilated factor = 1)        (Dilated factor = 2)        (Dilated factor = 3)

Initial    4.8k iterations    16k iterations    28k iterations    56k iterations    Converged $\dfrac{1}{9} \times$

| 1 | 1 | 1 |
| 1 | 1 | 1 |
| 1 | 1 | 1 |

3 x 3 box average filter

| | Max DSC | AUC |
|---|---|---|
| VGG-16 | 30.21% | 0.75 |
| Dilated VGG-16 | 32.45% | 0.78 |
| Box Conv | 33.17% | 0.89 |

BREAST ULTRASOUND DIAGNOSIS METHOD AND SYSTEM USING WEAKLY SUPERVISED DEEP-LEARNING ARTIFICIAL INTELLIGENCE

CROSS-REFERENCE TO RELATED APPLICATIONS

This present application is the US national phase of International Patent Application No. PCT/KR2022/002012, filed Feb. 10, 2022, which claims priority to Korean Application No. 10-2021-0019446, filed Feb. 10, 2021. These applications are hereby incorporated by reference in their entireties.

TECHNICAL FIELD

The present disclosure relates to artificial intelligence technology for diagnosing breast cancer by using a breast ultrasound image, and more particularly, to a method and a system for developing a weakly-supervised deep learning algorithm to diagnose breast cancer from ultrasound images without the need for image annotation of regions of interest, and to localize and visualize regions that contribute to the diagnosis.

BACKGROUND

Breast ultrasound is the primary examination equipment for the differential diagnosis of benign and malignant breast masses and is used for diagnostic and screening purposes. Ultrasound is gaining increasing interest as evidence continues to emerge that it can detect occult cancer that is difficult to detect with mammography, especially in women with dense breasts. The incident rate of breast cancer is number one among all female-type cancer, and early diagnosis of breast cancer is an important step in reducing breast cancer mortality. Breast cancer diagnosis using ultrasound has been widely applied to the diagnosis and observation of breast lesions due to its convenience, reliability, and high accuracy.

The principles of ultrasound diagnostics are as follows. First, the sound waves emitted from the ultrasound probe enter the gland and are absorbed or reflected by different tissue structures. The reflected waves are picked up by the probe and processed into an image by the ultrasound device. In general, detecting the benign or malignant nature of a tumor in ultrasound images and segmenting the region of interest is more difficult than in natural images, and this is because 1) ultrasound images have low contrast ratios and high speckle noise, 2) different tumors have large differences in shape and appearance, especially large differences between benign and malignant tumors, 3) there are tumor-like normal tissues and ultrasound artifacts, and 4) there is no clear definition of the tumor boundary itself.

Korean Patent Application Laid-Open No. 1020140109320 (published on Sep. 15, 2014) entitled "Method and Apparatus for Processing Ultrasound Image and Device for Diagnosing Breast Cancer" discloses an apparatus for diagnosing breast cancer, the apparatus including: acquiring segments of a multilayered structure by performing image segmentation on a received ultrasound image; extracting each segment feature from among the acquired segments of the multilayered structure; performing a targeted inspection on the received ultrasound image to generate an overcompletion sliding window as an inspection window; transferring the image features from the inspection window to the acquired segments of the multilayered structure; integrating each of the extracted segment features and the features transferred to the segments from the inspection window to proceed with training of a segment classifier; and receiving an output of the segment classifier and providing an integrated voltage to a paired CRF model to obtain a target of the segment.

However, even with these technologies, breast ultrasound may have a difference in diagnostic ability even between experts, and especially, there is a significant difference in diagnostic ability between non-experts and experts, resulting in a large number of false-positive and false-negative diagnoses, causing great harm to patients due to unnecessary biopsies and surgeries, as well as increasing medical costs, which is very problematic for society.

To overcome these limitations, several studies have been conducted to assist in the diagnosis of breast cancer from ultrasound images, and efforts are increasingly being made to apply a deep learning algorithm that is one of the most prominent techniques of artificial intelligence in the medical imaging field. Prior work on deep learning algorithms for diagnosing cancer by using ultrasound images is based on fully-supervised learning, which involves manually segmenting tumor lesions into Regions Of Interest (ROIs) and using the segmented ROIs as input to classify the ROI into benign and malignant lesions, and this typically requires an annotation process in which an expert manually draws ROIs of lesions in the image. Also, even though an automated ROI segmentation method is used rather than manual annotation, the verification of the ROIs by an expert is still required. The process of annotating images for the ROIs has the following limitations. First, the image annotation process for the ROI is time-consuming and labor-intensive, so that there is a limitation in developing robust deep learning models (with good diagnostic performance and applicable to other data) based on massive training data (usually thousands or tens of thousands of images are required for training). Second, the manual process of image annotation for ROIs is done after making subjective pre-judgments about lesion characteristics (boundaries and shape based on benign/malignant potential), which may negatively impact model performance by adding bias to deep learning algorithms that determines parameters based on data. Third, models based on image annotation of ROIs also require annotated images as an input value when applied clinically, so that in order to obtain the deep learning model prediction value for the image the user has to inconveniently specify the region of interest and perform ROI segmentation each time and thus the models based on image annotation of ROIs are difficult to be used clinically. Fourth, the area around the lesion (for example, surrounding tissue changes and echograms), rather than the lesion area, is often helpful for differential diagnosis of the lesion, and the current fully-supervised auxiliary diagnosis methods use only the lesion for learning, thereby being limited in learning comprehensive imaging information. Fifth, existing diagnostic methods are limited to the task of differential diagnosis of breast masses and cannot utilize normal images as input values. The largest area of the actual breast ultrasound image is the normal (lesion-free) breast image, so that this may be a significant impediment for clinical use.

Therefore, a weakly-supervised artificial intelligence learning method and system that can develop deep learning algorithms without an image annotation process for ROIs are urgently needed for breast cancer diagnosis from ultrasound images.

SUMMARY

The present disclosure has been conceived to provide a system for diagnosing breast cancer by performing differential diagnosis of discriminating normal/benign/malignant images from breast ultrasound images and visualizing the regions that contributed to the diagnosis by developing an efficient deep learning algorithm that does not require an image annotation process for Regions of Interest (ROIs) by using a weakly-supervised artificial intelligence learning method.

One aspect of the present disclosure for achieving the foregoing objects is to provide a method of diagnosing breast cancer by performing differential diagnosis for discriminating normal/benign/malignant from a breast ultrasound image having no image annotation for a Region Of Interest (ROI) and visualizing a region contributing to the diagnosis by developing a weakly-supervised deep learning algorithm. A method of breast ultrasound diagnosis using weakly-supervised Deep Learning (DL) artificial intelligence includes: an ultrasound image preprocessing operation for removing personal information of a patient from a breast ultrasound image to generate input data including only image regions required for training; a deep learning training operation for receiving the input data, and obtaining and retraining a feature map from the received input data by using a Convolutional Neural Network (CNN) and Global Average Pooling (GAP); a differential diagnosis operation for classifying the input data into one of normal, benign, and malignant by using the GAP, and calculating a Probability Of Malignancy (POM) indicative of the accuracy of the classification when the input data is classified into malignant; and a contribution region determination and visualization operation for backpropagating the result of the classification through the CNN, calculating the degree of contribution for each pixel that contributes to the result of the classification as a gradient and a feature value, and visualizing a contribution region (relevant region) that contributed to the classification based on the calculated degree of contribution for each pixel along with the POM, wherein the deep learning training operation is trained based on proven performance of the contributing region and the POM. In particular, the ultrasound image preprocessing operation includes: removing information in the Digital Imaging and Communications in Medicine (DICOM) header that relates to a patient's personal information by using a unique de-identification module developed for the ultrasound image; extracting an anonymized image or generating image data from ultrasound signals received from an ultrasound device by trimming an edge of the ultrasound image and removing remaining personal information and body markings and text annotations that interfere with training; and resizing the anonymized image or image data into input data having the same size as the image. The deep learning training operation includes: applying a data augmentation process by adding at least one of a geometric transformation and an optical transformation to the anonymized image to reduce errors in the verification and for a reproducible model; organizing an architecture of a deep learning algorithm by using at least one Convolutional Neural Network (CNN) performing image classification to learn normal/benign/malignant for the input data, and obtaining a feature map for each convolutional layer; and determining and retraining parameters for the obtained feature map. Further, the differential diagnosis operation includes: obtaining a feature value of each feature map of the last convolutional layer by using a Global Average Pooling (GAP) layer added after the convolutional layer in the architecture of the deep learning algorithm; and calculating a class score by applying a learnable weight to the obtained feature value, and calculating a Probability of Maliciousness (POM) from the calculated class score. Further, the contribution region determination and visualization operation includes: applying weights to the feature maps to obtain a Class Activation Map (CAM) for each class; scaling the obtained CAM by applying min-max normalization; performing binarization in which a threshold is applied on the scaled CAM to determine the contribution region; and visualizing the CAM together with the POM as a heat map. In particular, the geometric transformation includes at least one of horizontal flip, vertical flip, rotation, scaling, and translation, and the optical transformation includes at least one of deletion, speckle noise processing, sharpening, and Gaussian blurring.

Another aspect of the present disclosure for achieving the foregoing objects is to provide a system for diagnosing breast cancer by performing differential diagnosis for discriminating normal/benign/malignant from a breast ultrasound image having no image annotation for a Region Of Interest (ROI) and visualizing a region contributing to the diagnosis by developing a weakly-supervised deep learning algorithm. A system for breast ultrasound diagnosis using weakly-supervised Deep Learning (DL) artificial intelligence includes: an ultrasound image preprocessing module for removing personal information of a patient from a breast ultrasound image to generate input data including only image regions required for training; a deep learning training module for receiving the input data, and obtaining and retraining a feature map from the received input data by using a Convolutional Neural Network (CNN) and Global Average Pooling (GAP); a differential diagnosis module for classifying the input data into one of normal, benign, and malignant by using the GAP, and calculating a Probability Of Malignancy (POM) indicative of the accuracy of the classification when the input data is classified into malignant; and a contribution region determination and visualization module for backpropagating the result of the classification through the CNN, calculating the degree of contribution for each pixel that contributes to the result of the classification as a gradient and a feature value, and visualizing a contribution region (relevant region) that contributed to the classification based on the calculated degree of contribution for each pixel along with the POM, wherein the weakly-supervised deep learning algorithm is trained based on verified performance of the contributing region and the POM. In particular, the ultrasound image preprocessing module is configured to remove information in the Digital Imaging and Communications in Medicine (DICOM) header that relates to a patient's personal information by using a unique de-identification module developed for the ultrasound image, extract an anonymized image or generate image data from ultrasound signals received from an ultrasound device by trimming an edge of the ultrasound image and removing remaining personal information and body markings and text annotations that interfere with training, and resize the anonymized image or image data into input data having the same size as the image. Further, the deep learning training module is configured to apply a data augmentation process by adding at least one of a geometric transformation and an optical transformation to the anonymized image to reduce errors in the verification and for a reproducible model, organize an architecture of a deep learning algorithm by using at least one Convolutional Neural Network (CNN) performing image classification to learn normal/benign/malignant for the input data, and obtain a feature map for each convolutional layer, and determine and relearn parameters for the obtained feature map. Further, the differential diagnosis module is configured to obtain a feature value of each feature map of the last convolutional layer by using a Global Average Pooling (GAP) layer added after the convolutional layer in the architecture of the deep learning algorithm, and calculate a class score by applying a learnable weight to the obtained feature value, and calculate a Probability of Maliciousness (POM) from the calculated class score. Further, the contribution region determination and visualization module is configured to apply weights to the feature maps to obtain a Class Activation Map (CAM) for each class, scale the obtained CAM by applying min-max normalization, perform binarization in which a threshold is applied on the scaled CAM to determine the contribution region, and visualize the CAM together with the POM as a heat map. Further, the geometric transformation includes at least one of horizontal flip, vertical flip, rotation, scaling, and translation, and the optical transformation includes at least one of deletion, speckle noise processing, sharpening, and Gaussian blurring.

The weakly-supervised deep learning method according to the present disclosure is a form of deep learning that can be trained for image classification by using only unannotated images with only image-unit labels (normal/benign/malignant) without an image annotation process for the region of interest. The weakly-supervised deep learning algorithm has the following advantages.

First, compared to the fully-supervised learning, which requires image annotation of the region of interest, image-unit labels (normal/benign/malignant) alone are sufficient for training, so image data is trained in an efficient process that saves time, labor, and cost to develop robust (good diagnostic performance and applicable to other data) deep learning models. In particular, since the performance of deep learning is determined by data, an efficient data training process using a weakly-supervised deep learning algorithm may facilitate big data training to improve the performance of deep learning models and reduce verification errors in applying models to develop reproducible models.

Second, the weakly-supervised deep learning algorithm does not require manual work to annotate images for regions of interest, so that it is possible to minimize bias that may result from subjective pre-judgments of lesion characteristics (boundaries and shape based on a possibility of benign/malignancy) to develop reproducible models that stably operates for external verification data.

Third, the model based on image annotation for the region of interest requires an annotated image as an input value when applied clinically, so in order to obtain a deep learning model prediction value for an image, a user needs to inconveniently specify the region of interest and perform ROI segmentation each time, which is a limitation that reduces clinical utilization, but the invented weakly-supervised learning may easily input ultrasound images through the preprocessing method developed together, so the workflow using the model is much more efficient.

Fourth, in many cases, it is not the lesion area but the area around the lesion that is helpful for differential diagnosis of the lesion, but currently, the fully-supervised auxiliary diagnosis method is limited in training comprehensive image information due to the use of only the lesion for training, but in the weakly-supervised learning, not only the lesion area but also the surrounding area of the lesion are learned, the weakly-supervised learning may comprehensively learn information that is helpful for differential diagnosis and, as a result, lead to further improvement in diagnostic performance.

Fifth, existing diagnostic methods are limited to the task of differential diagnosis of breast masses and cannot utilize many normal (lesion-free) images as input values, but the deep learning models based on the weakly-supervised learning may utilize the entire ultrasound image as an input value, which is more suitable for the use of ultrasound for examination purposes, where abnormalities need to be detected from many normal images.

Finally, the developed deep learning algorithm may reduce the diagnostic gap between users by presenting accurate and highly reproducible probabilities of malignancy with parameter values learned from large amounts of data, and reduce user detection errors by providing visualized contribution regions. The diagnostic assistant function may reduce unnecessary biopsies and surgeries, minimizing harm to patients and reducing societal healthcare costs.

DETAILED DESCRIPTION

Figure 1:
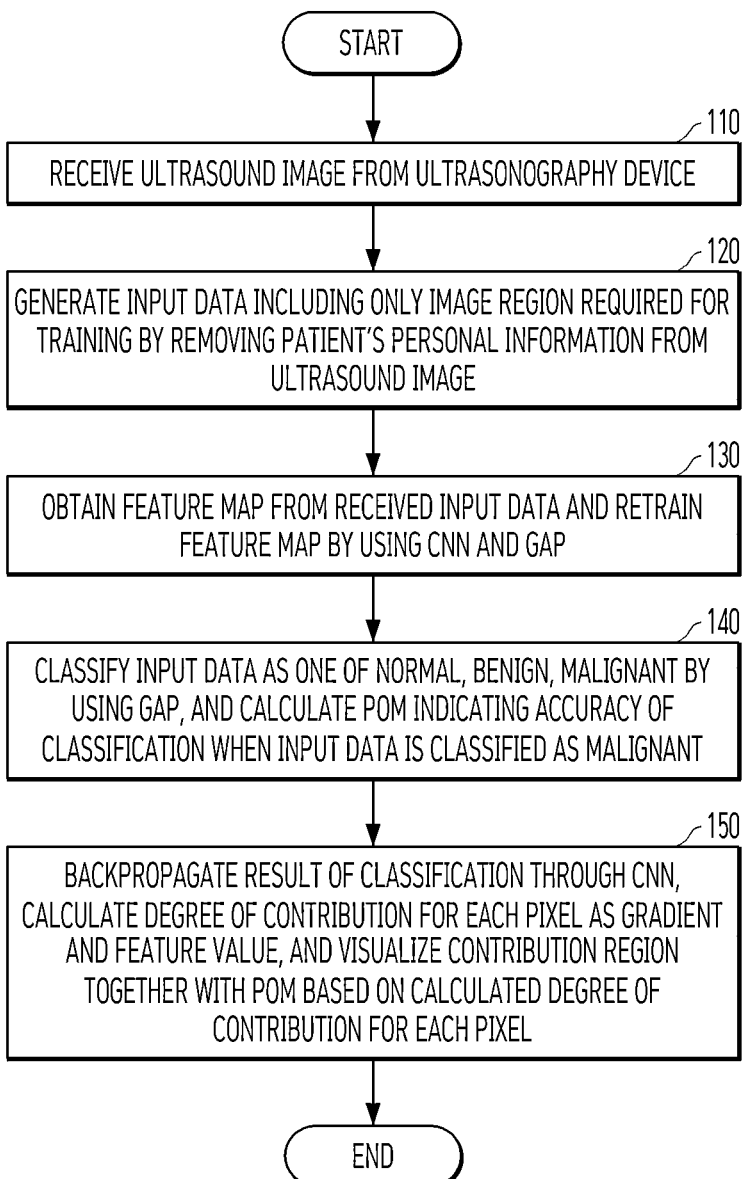
FIG. 1 is a flow diagram schematically illustrating a method of classifying images as normal/benign/malignant images and visualizing (localizing) contribution regions according to one aspect of the present disclosure.

In order to fully understand the present disclosure, its operational advantages, and the objects achieved by practicing the present disclosure, reference must be made to the accompanying drawings, which illustrate exemplary embodiments of the present disclosure, and the description thereof.

Hereinafter, the present disclosure will be described in detail by describing the exemplary embodiments of the present disclosure with reference to the accompanying drawings. However, the invention may be embodied in many different forms and is not limited to the embodiments described. Further, in order to clearly describe the present disclosure, parts irrelevant to the description are omitted, and identical reference numerals in the drawings indicate identical parts.

FIG. 1 is a flow diagram schematically illustrating a method of classifying images as normal/benign/malignant images and visualizing (localizing) contribution regions according to one aspect of the present disclosure.

According to a method of localizing and visualizing a malignant tumor from an unannotated breast ultrasound image by using a Convolutional Neural Network (CNN) to which a weakly-supervised Deep Learning (DL) algorithm is applied according to the present disclosure, an ultrasound image is first received (S110). Since the received image may include information that identifies a patient and information about ultrasound modality, the information is removed to leave only image information (S130). De-identification techniques that automatically separate an image region in an ultrasound image may be implemented by using ultrasound image modality-specific presets and image processing techniques (region growing+hole filling, and the like). However, it should be noted that this is provided for illustrative purposes only and is not intended to limit the invention.

The input image may include malignant tumors and benign tumors. Now, input data is received and a feature map is obtained and relearned from the received input data by using a CNN and Global Average Pooling (GAP) (S150). Thus, unlike the prior art, in the present disclosure, a feature map is directly acquired and relearned from the input image without the need to mark and annotate suspected lesion regions in the input image. Therefore, this may significantly reduce the time and manpower required for the manual annotation process, resulting in improvement of the training effect and increase in reliability of the result.

Then, the input data is classified as one among normal, benign, or malignant by using GAP, and when the input data is classified as malignant, a Probability Of Malignancy (POM) is calculated to indicate the accuracy of the classification (S170). In other words, by providing the probability of the result that the input data is classified as malignant together, the present disclosure may facilitate the verification of the classification result.

When the POM is calculated, the result of the classification of the input data is backpropagated through a CNN to calculate the degree of contribution for each pixel that contributes to the classification result as a gradient and a feature value, and a relevant region that contributes the classification is visualized along with the POM based on the calculated degree of contribution for each pixel (S190). In other words, the method of localizing and visualizing malignant tumors according to the present disclosure does not display only the relevant region without an input image, but directly displays the relevant regions classified from the entire input image, and visualizes the relevant regions differently by using different colors according to the POM. Therefore, it is possible to make a diagnosis by referring to the shape or characteristics around the lesion, which improves the diagnostic accuracy and improves the user's convenience, so that the method of localizing and visualizing malignant tumors according to the present disclosure is useful in the breast cancer diagnosis process.

These weakly-supervised deep learning algorithms are trained by verifying the performance of the diagnostic results and iterating on the weakly-supervised deep learning algorithms based on the verified performance. In this way, the weakly-supervised deep learning algorithm is trained by using the diagnostic results, which may quickly and accurately improve diagnostic performance without manual annotation.

Figure 2A:
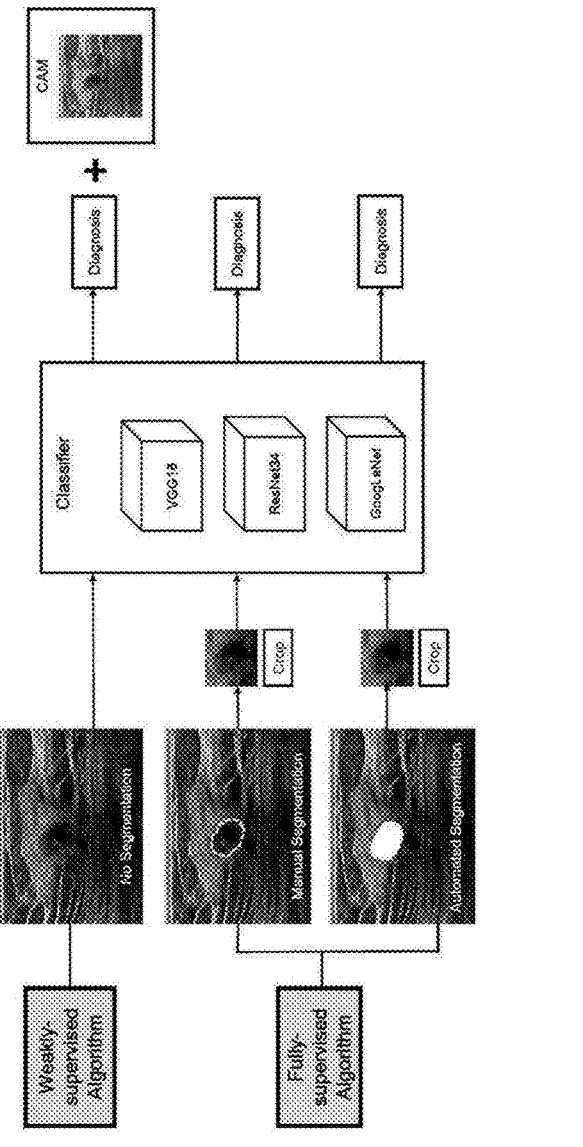
FIG. 2A is a block diagram illustrating an operation of one embodiment of a method of localizing and visualizing a malignant tumor according to one aspect of the present disclosure compared to the prior art.

FIG. 2A is a block diagram illustrating an operation of one embodiment of a method of localizing and visualizing a malignant tumor according to one aspect of the present disclosure compared to the prior art.

As illustrated in FIG. 2A, the method of localizing and visualizing malignant tumors according to the present disclosure does not require manual or automatic extraction (or cropping) and annotation of lesion sites in the input image, unlike the prior art, and the de-identified input image is input to a classifier as it is. That is, not only the image of the lesion is fed into the CNN, but almost all of the input images including the lesion are input. Further, the method of localizing and visualizing malignant tumors according to the present disclosure provides a heatmap along with the diagnosis result for user convenience and help the lesion site to be better displayed together with the probability.

Figure 2B:
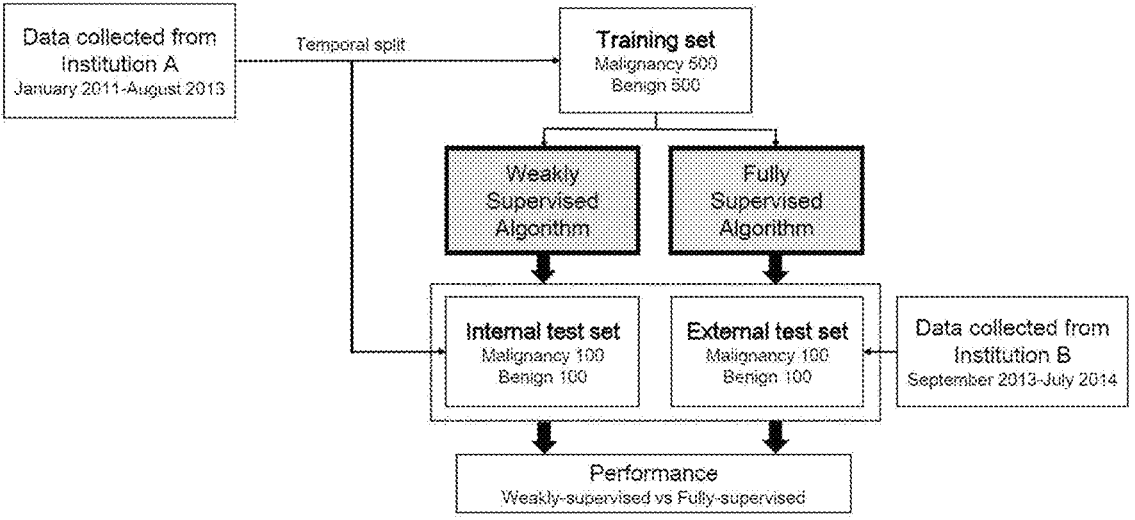
FIG. 2B is a block diagram illustrating a test dataset used to verify the operation of the method illustrated in FIG. 2A.

FIG. 2B is a block diagram illustrating a test dataset used to verify the operation of the method illustrated in FIG. 2A.

First, 1400 ultrasound images were collected from two hospitals. The weakly-supervised deep learning algorithm is implemented with three networks (VGG16, ResNet34, and GoogLeNet) and trained using 1000 unannotated ultrasound images (500 benign and 500 malignant masses). Two sets of 200 images (100 benign and 100 malignant masses) are used for the internal and external verification sets.

Then, for comparison with the fully-supervised algorithm, ROI annotation is performed manually and automatically by using a deep segmentation network (U-Net). Diagnostic performance is calculated as the area under the recipient operating characteristic curve (AUC) and compared across weakly-supervised and fully-supervised deep learning algorithms. By using the class activation map, it is determined how accurately the weakly-supervised deep learning algorithm localized the breast mass.

Figure 2C:
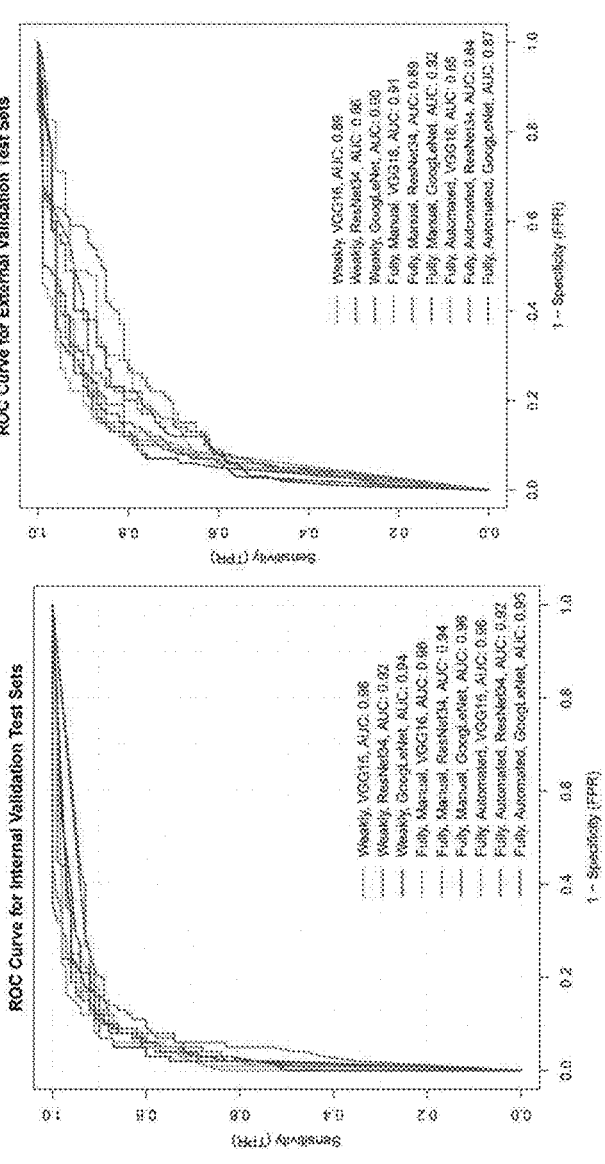
FIG. 2C is a graph depicting the performance of the method illustrated in FIG. 2A.

FIG. 2C is a graph depicting the performance of the method illustrated in FIG. 2A. In the internal verification set (A) and the external verification set (B), recipient operating characteristic curves (ROC) for different classifiers using a weakly-supervised algorithm and a fully-supervised DL algorithm with manual and automated ROI annotation. (A) An area AUC under the recipient operating characteristic curves of the weakly-supervised deep learning algorithm is not different from that of the fully-supervised deep learning algorithm (all Ps>0.05). (B) The AUC of the weakly-supervised deep learning is not statistically different (Ps>0.05) or higher (P=0.04, VGG16 with automated ROI annotation) than that of the fully-supervised deep learning algorithm.

As can be seen from FIG. 2C, the method of localizing and visualizing malignant tumors according to the present disclosure exhibits the performance equal to or better than that of the existing fully-supervised learning, despite that the input image with no annotation is input to the CNN.

Figure 2D:
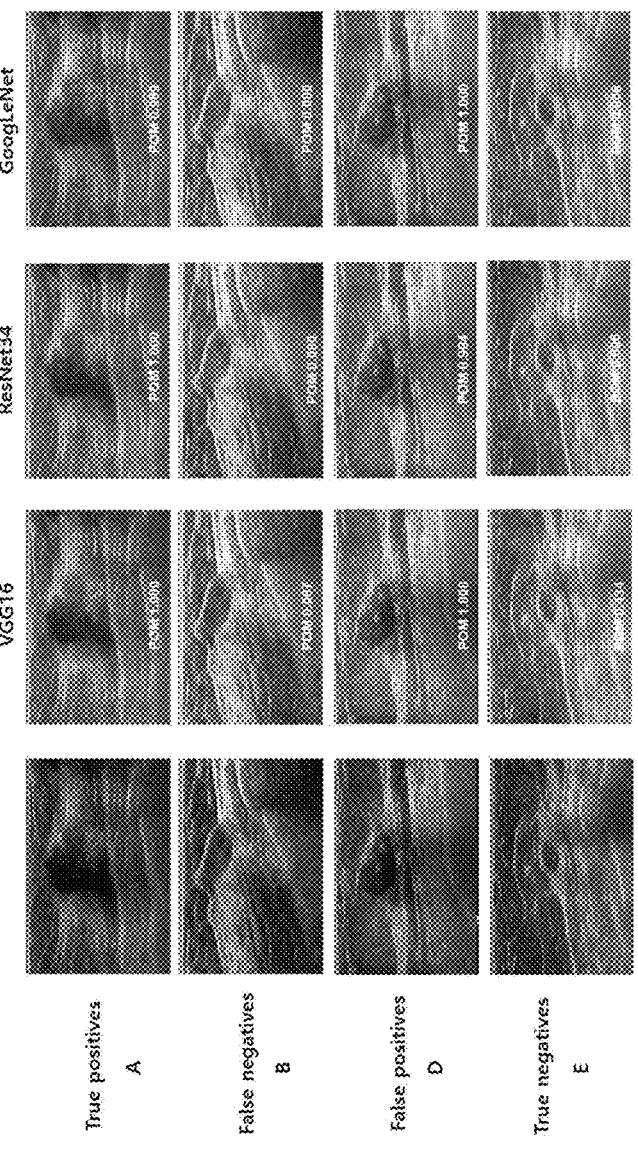
FIG. 2D is a drawing illustrating a result of the visualization by the method of FIG. 2A.

FIG. 2D is a drawing illustrating a result of the visualization by the method of FIG. 2A. Examples of true-positive (A), false-negative (B), false-positive (C), and true-negative (D) are shown for each network (VGG16, ResNet34, and GoogLeNet). (A) The ultrasound image shows a 17-mm irregular, pointed, invasive ductal carcinoma, which is predicted to be malignant by VGG16, ResNet34, and GoogLeNet with POMs of 1.00, 1.00, and 0.999, respectively. (B) The ultrasound image shows an 11-mm egg-shaped, circumscribed, isoechoic mucinous carcinoma, which was predicted to be benign with POMs of 0.007, 0.000, and 0.000, respectively. (C) The ultrasound image shows a 29-mm egg-shaped, macrocalcification (unchanged over 46 months follow-up) considered benign, which was predicted to be malignant with POMs of 1.000, 0.994, and 1.000, respectively. (D) The ultrasound image shows a 6-mm egg-shaped, localized mass considered benign (unchanged over 55 months of follow-up), which was predicted to be benign with POMs of 0.434, 0.006, and 0.006, respectively.

As a result, for the internal verification set, the weakly-supervised deep learning algorithm achieved good diagnostic performance, with AUC values of 0.92 to 0.96, which were not statistically different from those (AUC, 0.92 to 0.96) of the fully-supervised deep learning algorithm accompanied by manual or automated ROI annotation (all Ps>0.05). For the external verification set, the weakly-supervised deep learning algorithm achieved AUC values of 0.86 to 0.90, which were not statistically different (Ps>0.05) from or were higher (P=0.04 for automated ROI annotation, VGG16) than those (AUC, 0.84 to 0.92) of the fully-supervised deep learning algorithm. In the internal and external verification sets, the weakly-supervised algorithm was able to localize 100% of the malignant masses, except for ResNet34 (98%).

In more detail, the weakly-supervised deep learning algorithm using three representative networks (VGG16, ResNet34, and GoogLeNet) is utilized to predict malignancy along with a probability score from the benign mass according to the present disclosure. Furthermore, the discriminative localization performance of the weakly-supervised deep learning algorithm using a Class Activation Map (CAM) to highlight regions of the input image that contribute to the predicted result is examined. In addition, among the 1,400 collected images, 700 images were images of cancer confirmed by biopsy or surgery, and 700 images were images of benign masses confirmed by biopsy (n=163) or by at least two years of follow-up imaging (n=537). The dataset included a training set and a verification set. The training set included 500 benign masses and 500 malignant masses obtained from Institution A (data collection period: January 2011 to August 2013). The verification set was divided into internal and external verification sets, and each set included images (in 200, 100 benign masses and 100 malignant masses). The images for the internal verification were temporarily separated from Institution A (data collection period: September 2013 to July 2014) and were not used to train the algorithm. Further, the images for the external verification were continued to be obtained from Institution B (data collection period: May 2011 to August 2015). All breast ultrasound images were extracted from the image storing and communication system and stored in JPEG format. For the training and internal verification sets (obtained from Institution A), a single ultrasound machine was used to generate the images, whereas for the external verification set (obtained from Institution B), multiple ultrasound machines were used.

Figure 3:
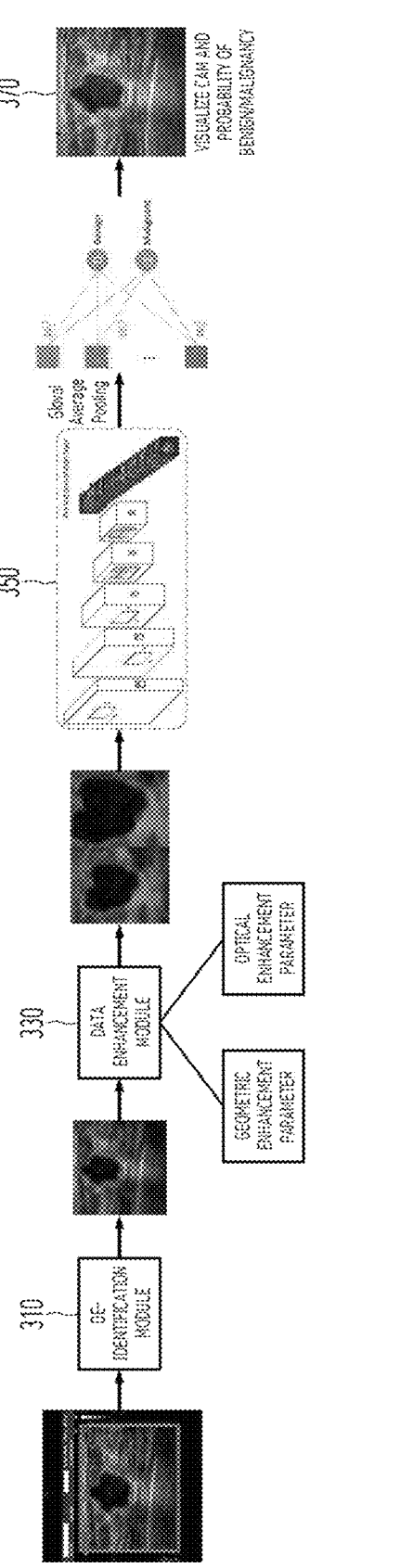
FIG. 3 is a block diagram illustrating a configuration and an operation of an embodiment of a system for localizing and visualizing malignant tumors according to another aspect of the present disclosure.

FIG. 3 is a block diagram illustrating a configuration and an operation of an embodiment of a system for localizing and visualizing malignant tumors according to another aspect of the present disclosure.

A system for localizing and visualizing a malignant tumor according to the present disclosure includes a de-identification module 310, a data enhancement module 330, a CNN 350, and a contribution region determination and visualization module 370.

The de-identification module 310 is part of an ultrasound image pre-processing module (not shown) and generates an input image from a breast ultrasound image that is subject to diagnosis and may include one or more of a malignant tumor and a benign tumor. To this end, the de-identification module 310 may be configured to remove patient body marks and text annotations by trimming edges of the breast ultrasound image to generate an anonymized image, and to extract the anonymized image having the same size as the input image.

The data enhancement module 330 is also included in the ultrasound image preprocessing module (not shown), and may add one of anonymized image geometric transformation and optical transformation to increase diagnostic performance. The geometric transformation may include horizontal flip, vertical flip, rotation, scaling, translate, and the like, and the optical transformation may include deletion, speckle noise processing, sharpening, Gaussian blurring, and the like. However, it should be noted that this is provided for illustrative purposes only and is not intended to limit the invention.

The output of the data enhancement module 330 is input to the CNN 350. In the present disclosure, the CNN 350 may be considered to perform the functions of a deep learning training module (not shown) and a differential diagnosis module (not shown) depending on its function.

Then, the deep learning training module (not illustrated) receives and relearns the input data, and obtains a feature map from the received input data using the CNN and the GAP. Furthermore, the differential diagnosis module (not illustrated) classifies the input data as one of normal, benign, and malicious by using the GAP and calculates the POM, which indicates the accuracy of the classification when the input data is classified as malignant.

Then, the contribution region determination and visualization module 170 back-propagates the result classified from the input data through the CNN, calculates the degree of contribution for each pixel that contributes to the result of the classification as a gradient and a feature value, and visualizes the contribution region that contributed to the classification based on the calculated degree of contribution for each pixel along with the POM.

In more detail, the de-identification module 310 removes information related to personal information of a patient in information of a DICOM header by using the unique de-identification module developed for the ultrasound image and removes the remaining personal information and body marks and text annotations that interrupts the learning by trimming the edge of the ultrasound image to extract an anonymized image. Alternatively, the de-identification module 310 may also directly generate the image data from the ultrasound signal received from the ultrasound device. In this case, the anonymized image or image data is preferably resized to the input data having the same size.

The deep learning training module may apply a data augmentation process by adding at least one of a geometric transformation and an optical transformation to the anonymized image to reduce errors in verification and generate a reproducible model. Further, the deep learning training module may configure an architecture of a deep learning algorithm by using at least one CNN that performs image classification, such as VGG16, ResNet34, and GoogLeNet, to learn normal/benign/malignant for the input data, thereby obtaining a feature map for each convolutional layer. The deep learning training module determines a parameter for the obtained feature map and re-learns the determined parameter to improve training accuracy.

Describing the differential diagnosis module, the differential diagnosis module obtains a feature value of each feature map in the last convolutional layer by using a GAP layer added after the convolutional layer in the architecture of the deep learning algorithm, and calculates a class score by applying a learnable weight to the obtained feature value. The differential diagnosis module then calculates the POM from the calculated class score.

When the POM is calculated, the contribution region determination and visualization module applies the weights to the feature map to obtain a CAM for each class, scales the obtained CAM by applying min-max normalization, and performs binarization in which a threshold is applied to the scaled CAM to determine the contribution region. The contribution region determination and visualization module then visualizes the determined CAM along with the POM as a heat map.

The visualized results may be used to train a weakly-supervised deep learning algorithm based on the verified performance of the region of interest (ROI) and the POM.

Table 1 shows the results obtained by using enhance data.

TABLE 1

| Model | Internal | | | External | | |
| --- | --- | --- | --- | --- | --- | --- |
| | Acc | Sens | Spec | Acc | Sens | Spec |
| ResNet-50 | 78.13% | 70.29% | 85.33% | 69.14% | 88.98% | 49.61% |
| Horizontal Flip | 79.17% | 73.19% | 84.67% | 75.00% | 89.76% | 60.47% |
| Vertical Flip | 79.51% | 75.36% | 83.33% | 73.05% | 85.04% | 61.24% |
| Rotate | 86.11% | 81.16% | 90.67% | 76.17% | 88.19% | 64.34% |
| Scale | 85.07% | 84.06% | 86.00% | 80.08% | 86.61% | 73.64% |
| Translate | 89.24% | 86.96% | 91.33% | 79.30% | 84.25% | 74.42% |
| Erasing | 81.00% | 77.33% | 84.67% | 77.04% | 85.16% | 68.99% |
| Speckle Noise | 76.00% | 67.33% | 84.67% | 70.82% | 97.66% | 44.19% |
| Sharpen | 74.33% | 73.33% | 75.33% | 70.04% | 85.94% | 54.26% |
| Gaussian Blur | 79.33% | 73.33% | 85.33% | 79.38% | 81.25% | 77.52% |

Hereinafter, the overall operation of the present disclosure will be described in more detail with reference to specific embodiments of the present disclosure.

Image Annotating and Preprocessing

The image is anonymized by trimming the edge of the image to remove body marks and text annotations. For the weakly-supervised deep learning algorithm, no additional data curation was performed to test the performance of the proposed system without ROI annotation. For comparison with the fully-supervised deep learning algorithm, ROI annotation is performed by using two methods: manual drawing and automated deep learning-based segmentation. For the manual drawing, the radiographer marked the ROIs and used an in-house drawing tool to mark binary masks for each mass. For the automated deep learning-based segmentation, the deep segmentation network U-Net is employed, which was developed for segmenting medical images. After the ROI annotation, rectangular images with a fixed margin of 30 pixels surrounding the corresponding mass were extracted, the corresponding image was resized to 224×224 pixels, and the pixel intensity was normalized to 0 to 1 by using a maximum intensity value.

Deep Classification Model

For a deep classifier, three representative convolutional neural networks, VGG16, ResNet34, and GoogLeNet, which have achieved state-of-the-art performance in various computer vision tasks, are employed. However, it should be noted that this is provided for illustrative purposes only and is not intended to limit the invention. The classification performance of the CNN model has been evaluated in several studies.

VGG16 is a feedforward neural network that stacks five convolutional blocks, and each of the blocks consists of two 3×3 convolutional layers and a max-pooling layer to learn relevant image features for classification tasks. The ResNet34 architecture is a deep CNN with residual connection function that can solve the problem of gradients disappearing as short cuts after the weighting layer. Finally, GoogLeNet consists of a stack of inception modules for training visual patterns at different scales. A single inception module includes multiple convolutional branches with different filter sizes from 1×1 to 5×5, to cost-effectively enhance the receptive field. The details of the architecture of the CNN model are publicly known.

To test the performance of discriminative localization by the weakly-supervised deep learning algorithm, the classification model may be extended with a GAP layer added to the last convolutional layer of each model. The GAP then creates a feature score ($F_k$) by averaging each feature map ($f_k$) in the last convolutional layer as follows.

$$F_k = \sum_{i,j} f_k(i, j) \qquad \text{[Equation 1]}$$

Herein, i and j are spatial indexes of $f_k$.

The number of feature maps equals the number of classes ($N_c$). Then, the model performs a linear classification by using fully connected layers and a SoftMax function. A fully connected layer with a learnable weight ($W=\{W_{kc}\}$) may calculate the class score ($S_c$) for each class as follows.

$$S_c = \sum_k w_{k,c} F_k \qquad \text{[Equation 2]}$$

The class scores are given to a SoftMax function to get the predicted probabilities of all classes. The predicted probability ($p_c$) and the POM of each class are calculated as follows.

$$p_c = \frac{\exp(S_c)}{\sum_{k=1}^{N_c} \exp(S_k)} \qquad \text{[Equation 3]}$$

$$POM = \begin{cases} P_c, & \text{if } c = \text{malignancy} \\ 1 - P_c, & \text{otherwise} \end{cases} \qquad \text{[Equation 4]}$$

Discriminative Localization

The CAM ($M_c$) of each class may be obtained by merging the feature maps by using the weights learned in the estimation of the class score.

$$M_c = \sum_k w_{k,c} f_k \qquad \text{[Equation 5]}$$

The relative intensity of $M_c$ is scaled by using min-max normalization for subject-to-subject comparison and visualization. The scaled class activation map ($M'_c$) is obtained as follows.

$$M'_c = \frac{M_c - \min(M_c)}{\max(M_c) - \min(M_c)} \qquad \text{[Equation 6]}$$

Concentrated regions within a tumor feature are determined by binarizing the scaled map by using a threshold ($M'_c \geq 0.3$). The threshold may be selected empirically by considering the overlap of binarized maps with manual ROI annotations in the training set.

Performance Metrics and Statistical Analysis

For differential diagnosis, the area (AUC) under the recipient operating characteristic curve was used as the primary metric to compare algorithm performance, and the DeLong test of significance was used to compare the AUCs of two correlated recipient operating characteristic curves (ROC). The exact McNemar test is used to test for differences in sensitivity and specificity. Discriminative localization is considered accurate when segmented sections overlap manually annotated sections. All statistical analyses are performed by using MedCalc statistical software, version 17.1 (Mariakerke, Belgium). A two-sided P value <0.05 is considered statistically significant.

Performance Metric

For the internal verification test set, the weakly-supervised deep learning model achieved high performance in the differential diagnosis of benign and malignant breast masses, and the AUC values are 0.96 (95% CI: 0.92, 0.98), 0.92 (95% CI: 0.88, 0.96), and 0.94 (95% CI: 0.90, 0.97) for the VGG16, ResNet34, and GoogLeNet models, respectively (Table 2). The AUC for the fully-supervised deep learning model with manual annotation is 0.96 (95% CI: 0.93, 0.98), 0.94 (95% CI: 0.89, 0.97), and 0.96 (95% CI: 0.92, 0.98) for VGG16, ResNet34, and GoogLeNet models, respectively. The AUCs for the fully-supervised deep learning models with automated annotation are 0.96 (95% CI: 0.92, 0.98), 0.92 (95% CI: 0.87, 0.95), and 0.95 (95% CI: 0.91, 0.98), respectively. Similarly, the AUC of the weakly-supervised deep learning model did not differ from that of the fully-supervised deep learning model with manual or automated ROI annotation (all Ps>0.05).

The sensitivity of the weakly-supervised deep learning model is 87% (87/100), 82% (82/100), and 87% (87/100) for the VGG16, ResNet34, and GoogLeNet models, respectively, and the specificity is 91% (91/100), 91% (91/100), and 94% (94/100), respectively. Sensitivity and specificity did not differ between weakly and fully-supervised deep learning models (all Ps>0.05).

For the external verification test set, the weakly-supervised deep learning models achieved high diagnostic performance, and the AUC values are 0.89 (95% CI: 0.84, 0.93), 0.86 (95% CI: 0.81, 0.91), and 0.90 (95% CI: 0.85, 0.94), which are slightly low, for the VGG16, ResNet34, and GoogLeNet models, respectively. The AUCs of the fully-supervised deep learning models with manual annotation were 0.91 (95% CI: 0.86, 0.95), 0.89 (95% CI: 0.84, 0.93), and 0.92 (95% CI: 0.87, 0.95) for the VGG16, ResNet34, and GoogLeNet models, respectively. The AUCs for the fully-supervised deep learning models with automated annotation were 0.85 (95% CI: 0.79, 0.89), 0.84 (95% CI: 0.78, 0.88), and 0.87 (95% CI: 0.82, 0.92), respectively. The AUCs of the weakly-supervised deep learning model were not statistically different from those of the fully-supervised deep learning model with manual ROI annotation (all Ps>0.05).

For the VGG16 network, the AUC was significantly higher (P=0.04) for the weakly-supervised deep learning model than for the fully-supervised deep learning model with automated ROI annotation. The ResNet34 and GoogLeNet networks did not show significant differences between the weakly-supervised deep learning model and the fully-supervised deep learning model with automated ROI annotation (all Ps>0.05). Sensitivity was not significantly different between the weakly-supervised deep learning model (91% [91/100] and 88% [88/100]) and the fully-supervised deep learning model (85% [85/100] and 87% [87/100]) on VGG16 and GoogLeNet (all Ps>0.05).

For the ResNet34 model, sensitivity was lower for the weakly-supervised deep learning model (78% [78/100]) than for the fully-supervised model with manual annotation (89% [89/100], P<0.001), but not significantly different from the fully-supervised deep learning model with automated ROI annotation (81% [81/100], P=0.66). The specificity of the weakly-supervised deep learning model (72% [72/100], 80% [80/100], and 76% [76/100] for the VGG16, ResNet34, and GoogLeNet networks, respectively) was not significantly different from that of the fully-supervised deep learning model with manual ROI annotation for the VGG16 (52% [52/100]) and GoogLeNet models (63% [63/100]) (all Ps>0.05), but was lower than that of the ResNet34 model (90% [90/100], P<0.001).

Specificity was higher with statistical significance or borderline significance (P <0.001, P=0.07, and P=0.04 for VGG16, ResNet34, and GoogLeNet models, respectively) in the weakly-supervised deep learning models than in the fully-supervised deep learning models with automated ROI annotation.

Performance Metrics for Discriminatory Localization

In the internal verification set, the weakly-supervised deep learning model using the VGG16 and ResNet34 networks may localize 99% (99/100) of benign masses and 100% (100/100) of malignant masses. The GoogLeNet network may localize 100% (100/100) of both benign and malicious masses. In the external verification set, the weakly-supervised deep learning models using VGG16, ResNet34, and GoogLeNet networks may localize 99% (99/100), 96% (96/100), 97% (97/100) of benign masses, and 100% (100/100), 98% (98/100), and 100% (100/100) malignant masses, respectively.

As such, when compared to the fully-supervised deep learning algorithm in the prior art, it was found that the weakly-supervised deep learning algorithm of the present disclosure has good diagnostic performance (AUC: 0.86-0.96) and is not deficient compared to the fully-supervised deep learning algorithms with manual annotation (AUC: 0.89 to 0.96) and the fully-supervised deep learning algorithms with automated annotation (AUC: 0.84 to 0.96). Furthermore, the weakly-supervised deep learning algorithms may accurately localize benign and malignant masses at a near-perfect rate (96%-100%).

This good classification and localization performance is achieved even on the external verification set using relatively small datasets, and different breast images, ultrasound equipment. Taken together, this confirms that it is possible to support judgment by using the weakly-supervised deep learning algorithm, and help detect and diagnose breast cancer in ultrasound images through a highly efficient data-curation process that does not require manual drawing or automated ROI segmentation.

While the deep learning algorithms have been successfully applied to mammography interpretation, the development of the deep learning algorithm for breast ultrasound images is still in its infancy. Nevertheless, it is promising that the deep learning algorithm may diagnose breast masses in ultrasound images with good performance.

While diagnostics using the CAD system in the related art are still limited in their application to images obtained with different equipment, the method and the system for localizing and visualizing malignant tumors according to the present disclosure is universal because the input image of the same size is input without change. In other words, the present disclosure may be widely applied to image-based classification using chest X-ray, MRI, or histopathology images and region-based classification using breast ultrasound images.

Figure 4:
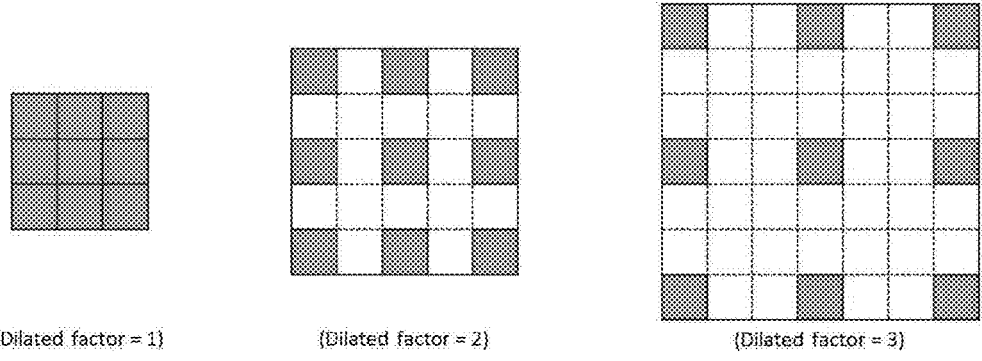
FIG. 4 is a diagram illustrating an extended convolution process that is applicable to the system for localizing and visualizing malignant tumors of FIG. 3.

FIG. 4 is a diagram illustrating an extended convolution process that is applicable to the system for localizing and visualizing malignant tumors of FIG. 3.

A receptive field refers to the area in the input space where the CNN model can operate in order to perform a given task, and increasing the receptive field requires increasing the size of the filter or stacking more layers. However, this may lead to an explosive increase of learnable parameters and numerical computation in neural networks.

To solve this problem, the extended convolution process proposes to perform convolutional operations with a predefined gap between pixels. As illustrated in FIG. 4, when the extended convolutional process is used, the receptive field may be expanded without increasing the amount of computation.

FIGS. 5A to 5D are diagrams for illustrating the concept of a learnable box filter that is applicable to the system of localizing and visualizing malignant tumors of FIG. 3.

Figure 5A:
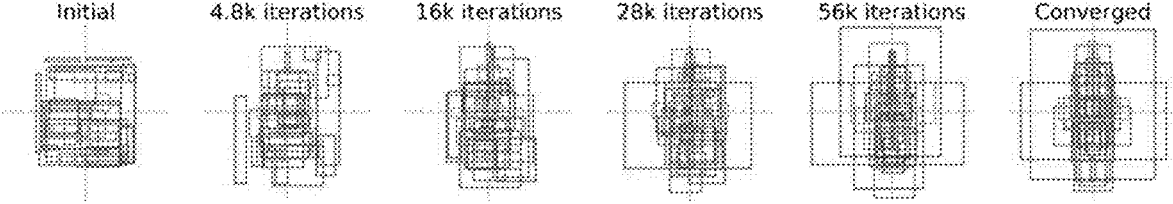
FIGS. 5A to 5D are diagrams for illustrating the concept of a learnable box filter that is applicable to the system of localizing and visualizing malignant tumors of FIG. 3.

Referring to FIG. 5A, the learnable box filter calculates an average over all locations and treats the coordinates of the box as a learnable parameter.

Figure 5B:
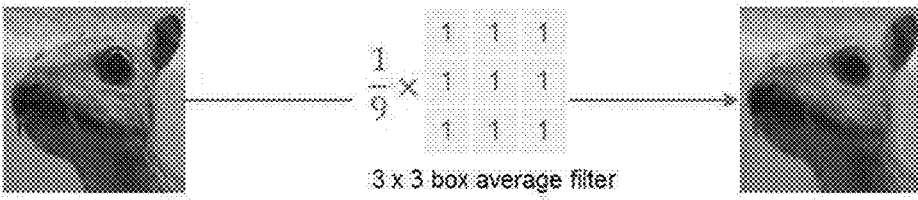

Referring to FIG. 5B, the convolutional average filter sums up all the values in the filter and divides the value of the sum by the size of the filter. Similarly, the box filter learns the parameters ($\theta=(x_{min}, x_{max}, y_{min}, y_{max})$) that determine the size of the filter while keeping the filter value fixed. While a 3×3 box-average filter is illustrated in FIG. 5B, it should be noted that this is provided for illustrative purposes only and is not intended to limit the present disclosure.

Figure 5C:
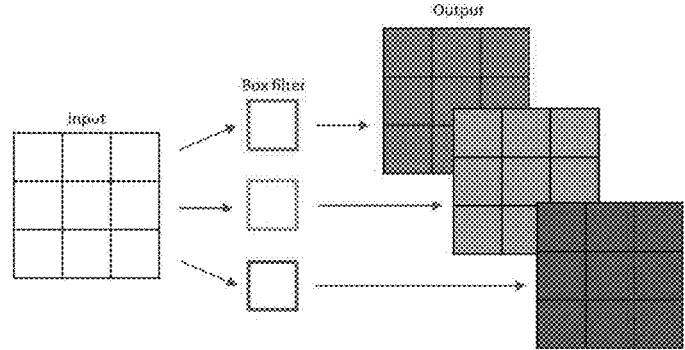

Referring to FIG. 5C, the box convolutional layer supports an operation for channel to train B different box filters for each of the C input channels. Therefore, the output consists of CB channels, and the number of learnable parameters is 4CB, which is a constant size independent of the filter size.

The input map I may then be expanded by using zero padding to maintain the size of the output feature map O. In the forward pass, O may be determined by the convolutional operation with the box filter.

$$O(x, y) = \sum_{u=x_{min}}^{x_{max}} \sum_{v=y_{min}}^{y_{max}} f_\theta(u, v)I(x-u, y-v) = \qquad \text{[Equation 7]}$$

$$\frac{1}{(x_{max}-x_{min})(y_{max}-y_{min})} \sum_{u=x_{min}}^{x_{max}} \sum_{v=y_{min}}^{y_{max}} I(x-u, y-v)$$

Figure 5D:
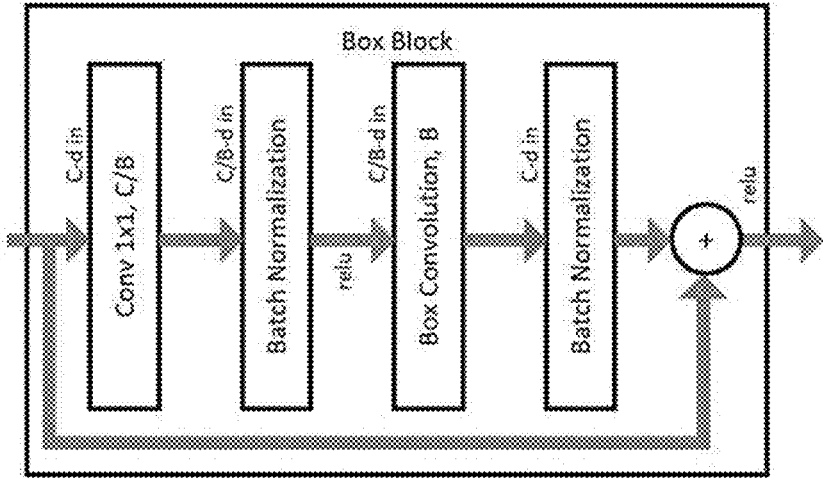

FIG. 5D is a diagram illustrating an integral image. As illustrated in FIG. 5D, an integral image is an algorithm for generating a sum of values within a subset of squares of a grid. It should be noted that FIG. 5D is provided for illustrative purposes only and is not intended to limit the present disclosure.

A box block (not shown in Figures) is applicable to the present disclosure. The box block has a cross-channel 1×1 convolutional layer because the box convolutional layer operates independently for each channel. The box block may also be expanded through batch normalization and residual connection.

Figure 6:
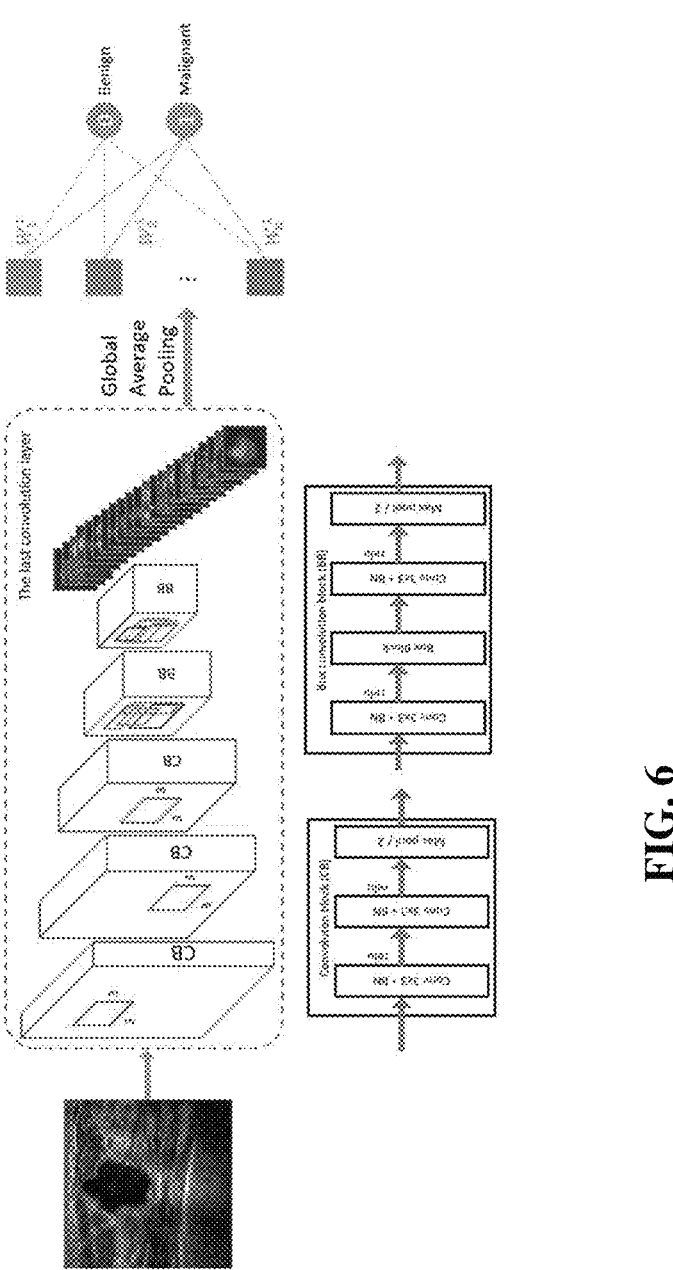
FIG. 6 is a block diagram illustrating a configuration and an operation of another embodiment of a system for localizing and visualizing malignant tumors according to another aspect of the present disclosure.

FIG. 6 is a block diagram illustrating a configuration and an operation of another embodiment of a system for localizing and visualizing malignant tumors according to another aspect of the present disclosure.

FIG. 6 is the same as the block diagram in FIG. 3, except that it includes a convolutional block (CB) and a box convolutional block (BB) as components of the CNN. Therefore, repetitive descriptions are omitted to simplify the specification.

Figure 7:
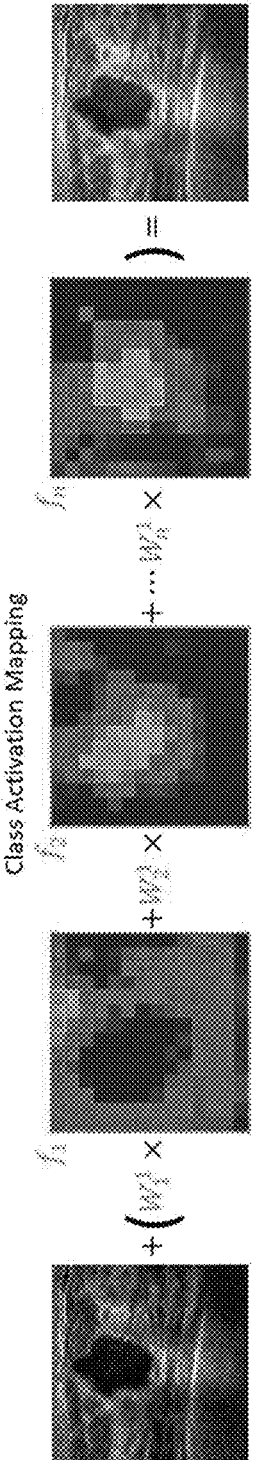
FIG. 7 is a diagram illustrating a CAM algorithm that is applicable to the system for localizing and visualizing malignant tumors of FIG. 3.

FIG. 7 is a diagram illustrating a CAM algorithm that is applicable to the system for localizing and visualizing malignant tumors of FIG. 3.

The CAMs is a map for a specific class to evaluate localization performance. When the CAM is used, regions of the input image that correspond to lesions may be highlighted and visualized.

The classification method using the deep learning algorithm may be categorized into region-based classification and image-based classification. For the region-based classification, tumor ROI extraction precedes the classification process.

In the present disclosure, image segmentation methods, such as U-Net, fully convolutional network, and fast R-CNN, are employed for the extraction of contribution regions. The image-based classification receives the entire ultrasound image (including the entire breast tissue around the tumor) as input and learns the ultrasound features relevant for tumor classification. The weakly-supervised deep learning algorithm of the present disclosure acts as an algorithm that better mimics a human than a fully-supervised deep learning algorithm in differentiating malignant masses and benign breast masses in ultrasound images. The algorithm built by a person employed by the Breast Imaging Reporting and Data System (BI-RADS) takes into account both the mass and the surrounding breast tissue. Thus, the weakly-supervised deep learning, which uses information from the entire image (not just the mass or its surroundings), may have advantages over the fully-supervised deep learning.

The proposed algorithm may learn important parts of the BI-RADS lexicon technical information outside of the mass (e.g., posterior features, structural distortions, and skin changes and edema) that are known to be helpful for differential diagnosis.

Furthermore, the weakly-supervised deep learning algorithm may also be applied to a deep learning-assisted detection framework for ultrasound breast lesions because the proposed algorithm may learn both disease regions and disease-free regions within breast tissue. In order to develop a detection framework, training disease-free regions is particularly important because the ultrasound appearance of breast tissue (especially in the mammary gland) varies greatly from person to person and varies greatly in each part of the breast, especially in terms of the amount and distribution of fibrous and glandular elements. Furthermore, once the normal appearance of the anatomical structure from the skin to the chest is known, the chest wall is essential for detecting pathology.

In summary, the GAP used in the present disclosure has the following advantages.

First, the GAP may significantly reduce the computational load and parameters, thereby making the network faster and more robust against overfitting problems.

Second, the present disclosure enhances feature maps to preserve spatial information related to classes so that the feature map may be used to interpret the judgments of CNN models. This method to identify regions that affect differential diagnosis using the GAP with the CAM leads to the concept of explainable AI (XAI). XAI or responsible-AI is an emerging paradigm to overcome the inherent "black box problem" created by deep frameworks, where it is impossible to understand how judgements are made. CAM provides intuition for interpreting the decision-making process implemented by AI. In addition, the weakly-supervised deep learning with the CAM enables healthcare providers to develop deep learning-assisted detection frameworks for clinically important regions.

Third, an advantage of the present disclosure is that the proposed weakly-supervised deep learning algorithm does not necessarily require training with large datasets to be implemented.

Fourth, to detect and diagnose malignancy from benign breast masses, the weakly-supervised deep learning algorithm without image ROI annotation accurately detects breast masses and exhibits performance comparable to the existing fully-supervised deep learning algorithms. The good performance of differential diagnostic and discriminative localization and the high efficiency of data curation obtained by the weakly-supervised deep learning algorithm indicate that the invention is feasible and a valuable candidate for testing in further clinical studies.

Figure 8:
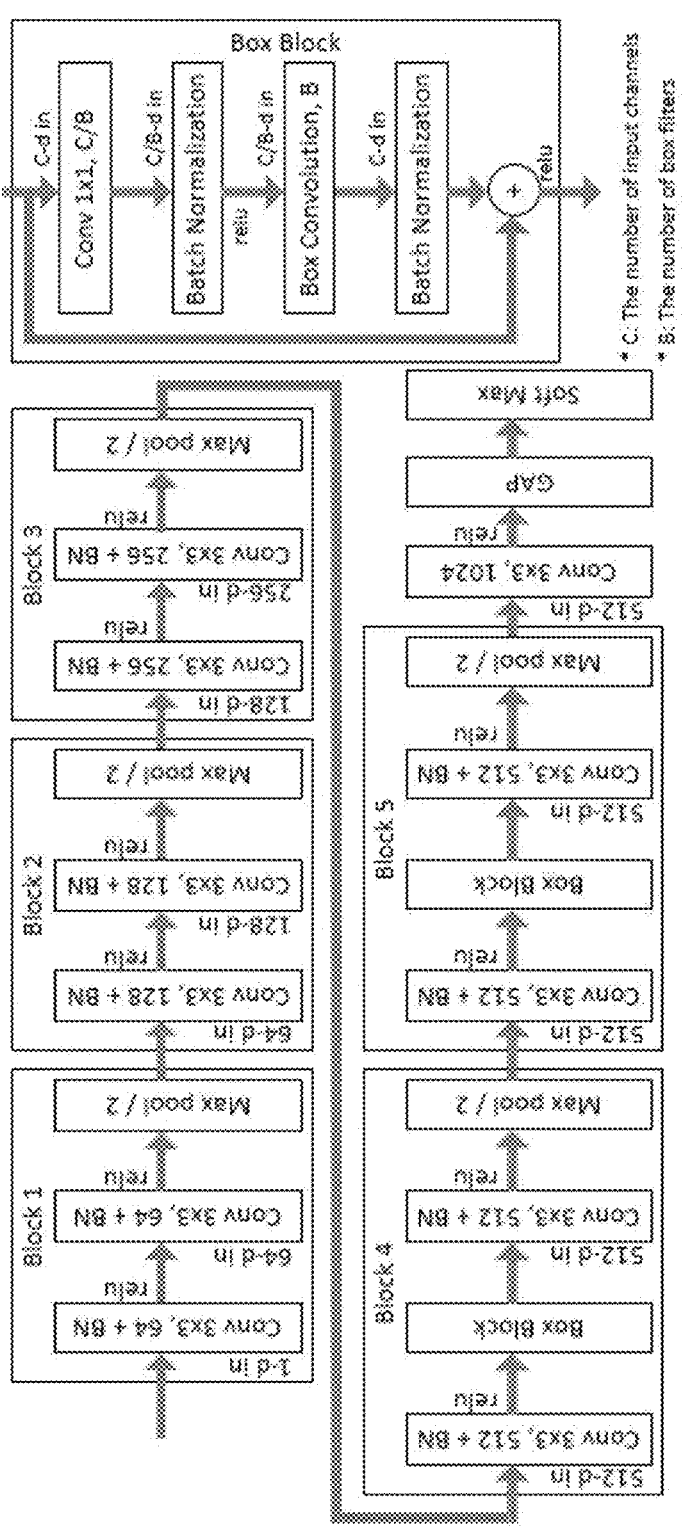
FIG. 8 is a diagram schematically summarizing the architecture of the system for localizing and visualizing malignant tumors of FIG. 3.
Figure 9:
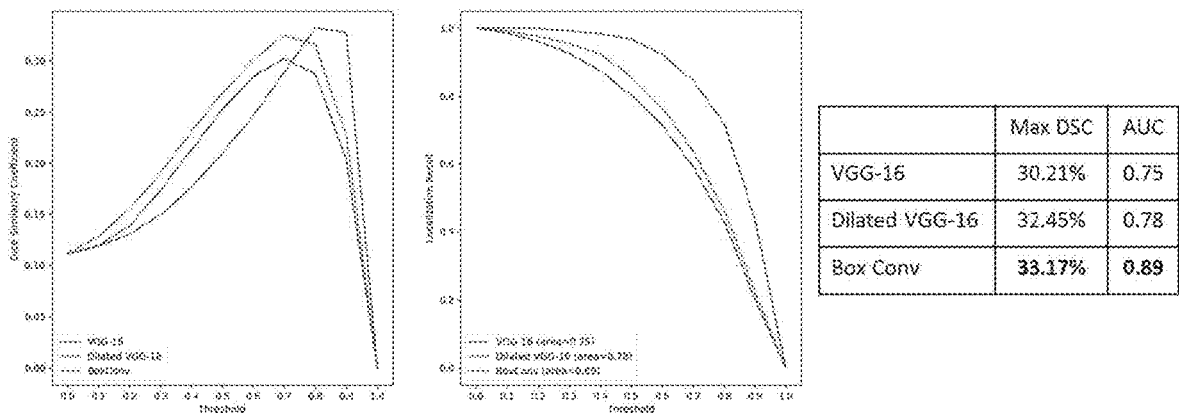
FIG. 9 is a graph illustrating the performance of the system for localizing and visualizing malignant tumors of FIG. 3.

FIG. 8 is a diagram schematically summarizing the architecture of the system for localizing and visualizing malignant tumors of FIG. 3, and FIG. 9 is a graph illustrating the performance of the system for localizing and visualizing malignant tumors of FIG. 3.

As mentioned above, the weakly-supervised deep learning algorithm do not require image annotation of the lesion's ROI, while the fully-supervised deep learning algorithm require tumor segmentation (manual or automatic) and cropping of the ROI before entering the classifier. For the weakly-supervised deep learning algorithm, a CAM is generated to visualize the regions detected by the algorithm by using a GAP that is added to the last convolutional layer.

This performance may be determined by the following equation.

$$DSC = \frac{2|\text{Mask} \cap CAM_l|}{|\text{Mask}| + |CAM_l|} \qquad \text{[Equation 8]}$$

$$\text{Recall} = \frac{|\text{Mask} \cap CAM_l|}{|\text{Mask}|}$$

For Equation 8, Chanho Kim, Won Hwa Kim, Hye Jung Kim, and Jaeil Kim, "Weakly-supervised US breast Tumor Characterization and Localization with a Box Convolution Network" is referred.

Figure 10:
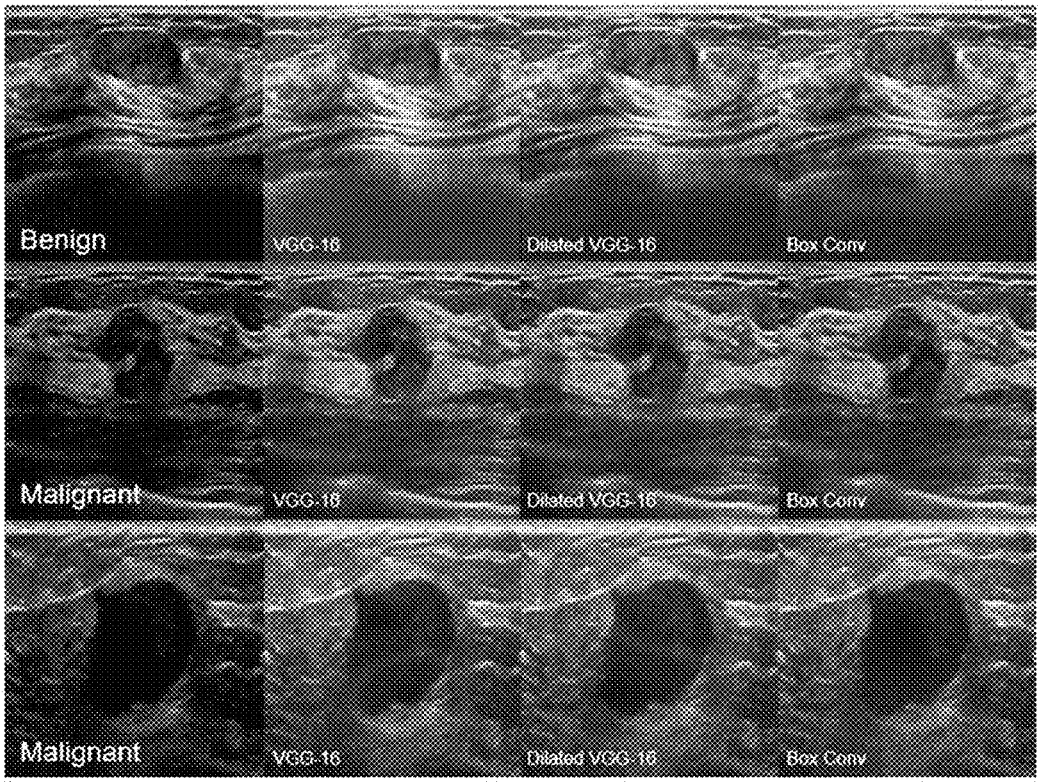
FIG. 10 is a drawing illustrating some examples of a heat map implemented by the system of FIG. 3.

FIG. 10 is a drawing illustrating some examples of a heat map implemented by the system of FIG. 3.

Referring to FIG. 10, the method and the system for localizing and visualizing malignant tumors according to the present disclosure provides performance comparable to or better than the fully-supervised learning by the related art, and improves examination accuracy because image information about the tissue surrounding the lesion is displayed as it is.

The invention has been described with reference to the embodiments illustrated in the drawings, which are exemplary only, and those skilled in the art will understand that various modifications and equally valid other embodiments are possible. For example, to make the weakly-supervised deep learning algorithm be more widely used in medical images, the algorithm is applicable to images from other body parts or other imaging modalities.

The method according to the present disclosure may be implemented as a computer-readable code on a computer-readable recording medium. A computer-readable recording medium may include any kind of recording device on which data is stored that can be read by a computer system. Examples of computer-readable recording media include ROM, RAM, CD-ROM, magnetic tape, floppy disks, and optical data storage devices, and also include those implemented in the form of carrier waves (for example, transmission over the Internet). The computer-readable recording medium may also store computer-readable code that may be executed in a distributed manner by a networked distributed computer system.

As used in this specification, the singular expression shall be understood to include the plural unless the context clearly indicates otherwise, the term "includes" and the like shall be understood to mean the presence of the features, numbers, steps, actions, components, parts, or combinations thereof set forth, and not to exclude the possibility of the presence or addition of one or more other features, counts, steps actions, components, parts, or combinations thereof. Further, the terms "part," "unit," "module," "block," and the like as used in the specification refer to a unit that handles at least one function or operation, which may be implemented in hardware or software or a combination of hardware and software.

Accordingly, the embodiments and the drawings accompanying this specification clearly illustrate only a portion of the technical spirit included in the present disclosure, and all modified examples and specific embodiments that can be readily inferred by those skilled in the art within the scope of the technical spirit included in the specification and drawings will be self-evident to be included in the scope of the present disclosure.

The weakly-supervised deep learning algorithm developed in the present disclosure may be used for ultrasound diagnosis of breast cancer with good localization and differential diagnosis.

What is claimed is:

1. A method performed by a computing device for diagnosing ultrasound images, the method comprising:
   acquiring ultrasound image data;
   generating one or more feature maps based on the ultrasound image data by using a deep learning model;
   computing a score for each class of the ultrasound image data based on the one or more feature maps by using the deep learning model;
   generating classification information based on the score for each class;
   computing a probability of malignancy based on the classification information;
   generating a class activation map for each class based on the one or more feature maps;
   normalizing the class activation map;
   binarizing the normalized class activation map by using a preset threshold;
   determining a contribution region based on the binarized class activation map; and generating a diagnostic visualization information based on the probability of malignancy, the class activation map, the ultrasound image data and the contribution region, wherein the deep learning model is a model trained based on classification information entirely of ultrasound image data for training without information related to segmentation of the ultrasound image data for training.

2. The method of claim 1, wherein the classification information includes at least one of normal, benign, or malignant.

3. The method of claim 1, wherein the diagnostic visualization information includes, for each pixel of the ultrasound image data, information in which the degree of each pixel contributing to generate the classification information is visualized.

4. The method of claim 1, wherein the deep learning model is a model trained with operations of:

preprocessing one or more ultrasound image data for training;

labeling the preprocessed ultrasound image data with classification information to form a training data set; and training the deep learning model to output classification information for each of the ultrasound image data included in the training data set by using the training data set.

5. The method of claim 4, wherein the preprocessing of the one or more ultrasound image data for training includes:

removing personal information of a patient from the one or more ultrasound image data for training;

trimming edges of the ultrasound image data in which the personal information is removed; and resizing the ultrasound image data in which the edges are trimmed.

6. The method of claim 4, further comprising:

performing data augmentation on the preprocessed ultrasound image data for training, wherein the performing of the data augmentation on the preprocessed ultrasound image data for training includes:

performing at least one of a geometric transformation or an optical transformation on the preprocessed ultrasound image data for training to generate at least one new image data; and including the at least one new image data in the training data set.

7. The method of claim 6, wherein the geometric transformation includes at least one of a horizontal flip, a vertical flip, a rotation, a scaling, or a translocation.

8. The method of claim 6, wherein the optical transformation includes at least one of deletion, speckle noise processing, sharpening, or Gaussian blurring.

9. The method of claim 1, wherein the generating of the one or more feature maps based on the ultrasound image data by using the deep learning model includes:

generating the one or more feature maps based on input of the ultrasound image data into a convolutional neural network including one or more convolutional layers.

10. The method of claim 1, wherein the computing of the score for each class of the ultrasound image data based on the one or more feature maps by using the deep learning model includes:

computing the score for each class of the ultrasound image data based on input of the one or more feature maps to a global average pooling layer.

11. The method of claim 1, wherein the generating the class activation map for each class based on the one or more feature maps includes:

generating the class activation map for each class based on the one or more feature maps and a weight of the deep learning model.

12. The method of claim 11, wherein the weight of the deep learning model includes:

a weight trained by the deep learning model in the process of generating the classification information.

13. A computer program stored in a non-transitory computer-readable storage medium including operations for diagnosing an ultrasound image by a computing device, the operations comprising:

acquiring ultrasound image data;

generating one or more feature maps based on the ultrasound image data by using a deep learning model;

computing a score for each class of the ultrasound image data based on the one or more feature maps by using the deep learning model;

generating classification information based on the score for each class;

computing a probability of malignancy based on the classification information;

generating a class activation map for each class based on the one or more feature maps;

normalizing the class activation map;

binarizing the normalized class activation map by using a preset threshold;

determining a contribution region based on the binarized class activation map; and generating a diagnostic visualization information based on the probability of malignancy, the class activation map, the ultrasound image data and the contribution region, wherein the deep learning model is a model trained based on classification information of ultrasound image data for training, without information related to segmentation of the ultrasound image data for training.

14. A computing device, comprising:

a processor including one or more cores; and a memory, wherein the processor:

acquires ultrasound image data, generates one or more feature maps based on the ultrasound image data by using a deep learning model, computes a score for each class of the ultrasound image data based on the one or more feature maps by using the deep learning model, generates classification information based on the score for each class, computes a probability of malignancy based on the classification information, generates a class activation map for each class based on the one or more feature maps, normalizes the class activation map, binarizes the normalized class activation map by using a preset threshold, determines a contribution region based on the binarized class activation map, and generates a diagnostic visualization information based on the probability of malignancy, the class activation map, the ultrasound image data and the contribution region, wherein the deep learning model is a model trained based on classification information of ultrasound image data for training, without information related to segmentation of the ultrasound image data for training.

\* \* \* \* \*